Jan. 6, 1970            J. BOUDET            3,488,174
MANUFACTURE OF MOULDS OF TEMPERED GLASS INTENDED
FOR THE PRODUCTION OF OPTICAL AND OPHTHALMIC
LENSES OF THERMO-SETTING RESINS
Filed Dec. 27, 1966

INVENTOR
JEAN BOUDET
By Young + Thompson
ATTYS.

United States Patent Office 3,488,174
Patented Jan. 6, 1970

3,488,174
MANUFACTURE OF MOULDS OF TEMPERED GLASS INTENDED FOR THE PRODUCTION OF OPTICAL AND OPHTHALMIC LENSES OF THERMO-SETTING RESINS
Jean Boudet, 33 Rue de l'Isle d'Amour, Champigny, Val-de-Marne, France
Filed Dec. 27, 1966, Ser. No. 604,759
Claims priority, application France, Jan. 11, 1966, 45,449
Int. Cl. C03c *19/00*
U.S. Cl. 65—61
2 Claims

ABSTRACT OF THE DISCLOSURE

The invention relates to improvements in the manufacture of tempered-glass moulds intended for the production of optical and ophthalmic lenses of thermosetting resins, in which deformation of the mould element due to surface machining operations is avoided by carrying out the machining after tempering and by the use of a resilient mounting for the mould element during machining. The resilient mounting may comprise a rubber or like elastic washer interposed between the mould element and its rotating support.

---

In the U.S. Patent No. 3,278,654 of Oct. 11, 1966, there has been described the manufacture of optical or opthalmic lenses of thermo-setting plastic resins, especially with a base of allyl derivatives. In this manufacture, the monomer resin is placed in glass moulds provided internally with an optically-polished wall, and polymerized in these moulds by passing into an oven at a temperature which follows a pre-determined progression.

In order that the moulds for treating the thermosetting resin can adapt themselves to the shrinkage of this latter material during its polymerization, it has been proposed to make them of tempered glass having a substantially constant thickness. In addition, in order to rectify the deformation to which they may be subjected due to tempering, these moulds of tempered glass are given their final surfacing and polishing after tempering.

In order to carry out this machining of the tempered glass moulds, it has been proposed to make use of the technique employed in the surfacing of glass lenses. In this technique, it is the general practice to fix the element to be surfaced on its support by backing, that is to say by sticking the glass element on a metal support which enables it to be held on the treatment machine and to be applied against the tool. This sticking is most frequently effected by means of a cement which is a mixture of pitch, wax, colophany and whiting. It is also possible to employ a metallic alloy with a low melting point which ensures the adhesion of the glass to the support.

This backing ensures rigid fixing of the glass element on its support. While this rigidity is advantageous in the case of lenses which are surfaced on both faces, it may constitute a disadvantage for the machining of glass moulds, especially of tempered glass, which are machined on one face only.

In fact, the tempered glass mould element is flexible and in consequence becomes deformed immediately when it comes under the pressure of the tool. Furthermore, the machining of a previously tempered element changes its mechanical equilibrium and causes a modification of the part. This modification becomes evident, at the moment of separation of the mould element from its support, by a deformation which changes the geometric characteristics of the mould, and in consequence those of the lens which it will be employed to form.

The present invention has for its object to overcome this difficulty.

It consists in replacing the rigid backing of the mould elements for the purpose of their surface machining by a resilient mounting.

In particular, the mould of tempered glass is mounted on its support by an elastic intermediate piece such as a washer of plastic material or of similar material having the same characteristics.

By virtue of this flexible mounting, the mould element of tempered glass has the ability of re-assuming its state of equilibrium at each instant during its machining, while at the same time conforming to the curvature of the surfacing tool. When the surface machining is completed, the mould element removed from its support does not take any deformation.

The accompanying drawings illustrate this method of machining.

Figure 1:
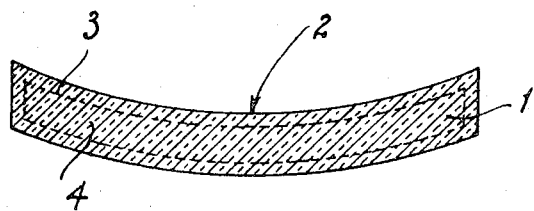
FIG. 1 shows in cross-section one of the elements of the mould of tempered glass.

As described and shown in the above-mentioned U.S. Patent No. 3,287,654, the polymerization mould for the optical lens of thermo-setting resin is composed of two elements of glass assembled together by a joint of suitable plastic material. As indicated in FIG. 1, each element is a glass mould element 1 of substantially constant thickness and thus having its two faces substantially parallel.

This mould element is tempered, after which its face 2, which is to come into contact with the thermo-setting resin, is surfaced and polished after tempering.

In order to carry out the tempering of the mould element 1, this mould element is brought up to the softening temperature of the glass and is then abruptly subjected to the action of a cold fluid, either by projection of a jet of air at the ambient temperature, or by immersion in a cold liquid bath. This treatment has the effect of giving the mould element increased elasticity, enabling it to deform and in particular to follow the shrinkage of the thermo-setting material during its polymerization, this shrinkage being capable of reaching 14%.

The tempering has the effect of producing over the surface of the mould element 1 a stretched layer, indicated diagrammatically at 3. This outer layer of glass compresses the internal material 4. It is this sandwich-type construction 3-4-3 which gives the mould element its elasticity.

The tempered mould element 1 is then machined over its face 2 in order to give it the desired optical polish.

Figure 2:
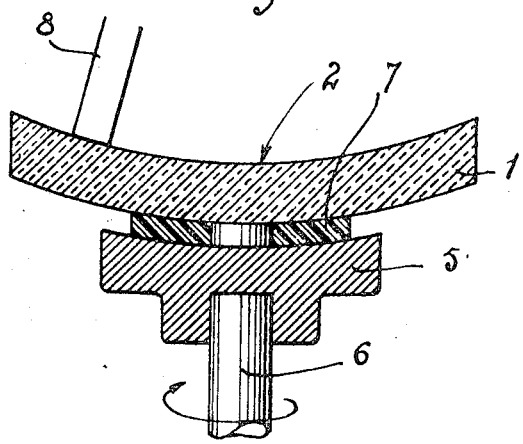
FIG. 2 shows a cross-section of the mounting of this element on the surfacing and polishing device.

According to the invention, this machining is effected by fixing the mould element 1 to its support by a resilient mounting, as shown in FIG. 2.

In the method of construction shown, the support is constituted by a dished plate 5 rigidly fixed on the rotational driving shaft 6. On this plate 5, the mould element 1 of tempered glass is fixed by means of a flexible washer 7, which is secured both to the plate 5 and to the mould element 1. This washer 7 is of elastic material such as rubber or plastic material or the like.

On the face 2 of the mould element mounted as above described, the operations of surfacing and polishing are carried out by means of the tool 8.

By virtue of this arrangement, as and when the machining, surfacing and polishing are completed, the mould element 1 regains its mechanical equilibrium while at the same time it conforms to the curvature of the tool 8 with which it is in contact.

When the operations are completed and the mould element 1 is removed from its support, no deformation due to the initial tension of the outer layer 3 takes place. In short, by the flexible mounting, the mould element 1 retains a constant internal equilibrium which it maintains after the machining has been completed.

What I claim is:

1. A method of manufacturing mould elements for the production of optical and ophthalmic lenses of thermosetting plastic material, comprising heating a glass mould element, contacting the heated glass mould element with a relatively cold fluid thereby to produce a tempered glass mould element having over all its surface a stretched layer, pliably securing the tempered glass mould element to a rotatable support by means of a member of elastic deformable material, rotating said support and machining one face only of said tempered glass mould element to reduce the thickness of said layer on one side only of said element and to produce on said one face a curved surface corresponding to the optical surface to be imparted to the moulded lenses, and removing the machined mould element from said member so that after removing the machined mould element the curvature of said machined curved surface remains unchanged.

2. A method as claimed in claim 1, in which said member is a ring coaxial with the axis of rotation of said rotatable support.

References Cited

UNITED STATES PATENTS

| | | | |
|---|---|---|---|
| 2,395,700 | 2/1946 | Walker | 51—216 |
| 2,441,108 | 5/1948 | Turner | 51—216 |
| 3,321,870 | 5/1967 | Bolden | 51—216 X |
| 3,337,659 | 8/1967 | Grandperret | 51—284 X |
| 3,150,950 | 9/1964 | English et al. | 65—112 XR |
| 3,264,079 | 8/1966 | McKelvey | 65—114 XR |
| 3,297,422 | 1/1967 | Emerson et al. | 65—54 |

FOREIGN PATENTS

| | | |
|---|---|---|
| 67,056 | 11/1960 | Netherlands. |
| 449,319 | 6/1949 | Italy. |

FRANK W. MIGA, Primary Examiner

U.S. Cl. X.R.

51—216, 283, 284; 65—54, 112, 114, 374